United States Patent
Meinecke et al.

(10) Patent No.: US 12,546,855 B2
(45) Date of Patent: Feb. 10, 2026

(54) AESA-BASED SYNTHETIC NULLING FOR ENHANCED RADAR GROUND CLUTTER SUPPRESSION

(71) Applicant: Rockwell Collins, Inc., Cedar Rapids, IA (US)

(72) Inventors: James P. Meinecke, Fayetteville, AR (US); Venkata A. Sishtla, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 370 days.

(21) Appl. No.: 18/200,900

(22) Filed: May 23, 2023

(65) Prior Publication Data

US 2024/0393427 A1    Nov. 28, 2024

(51) Int. Cl.
G01S 7/28      (2006.01)
G01S 7/02      (2006.01)
G01S 7/292     (2006.01)

(52) U.S. Cl.
CPC ............ G01S 7/2813 (2013.01); G01S 7/023 (2013.01); G01S 7/292 (2013.01)

(58) Field of Classification Search
CPC ......... G01S 7/2813; G01S 7/023; G01S 7/292
See application file for complete search history.

(56) References Cited

U.S. PATENT DOCUMENTS

| | | | |
|---|---|---|---|
| 6,075,484 A * | 6/2000 | Daniel | G01S 3/74 342/372 |
| 8,427,370 B2 | 4/2013 | Pozgay | |
| 8,717,230 B1 * | 5/2014 | Fischi | G01S 13/5244 342/194 |
| 8,963,774 B1 * | 2/2015 | Livadaru | H01Q 3/446 342/374 |
| 9,042,017 B1 * | 5/2015 | Wardlaw | G02B 27/09 359/483.01 |
| 9,397,766 B2 | 7/2016 | Puzella et al. | |
| 11,329,375 B1 | 5/2022 | West et al. | |
| 2021/0173040 A1 * | 6/2021 | Pauplis | G01S 13/426 |

(Continued)

FOREIGN PATENT DOCUMENTS

| | | |
|---|---|---|
| EP | 1267444 A2 | 12/2002 |
| EP | 4174514 A1 | 5/2023 |

OTHER PUBLICATIONS

European Search Report received in EP Application No. 24177252, Sep. 23, 2024, 6 pages.

*Primary Examiner* — William Kelleher
*Assistant Examiner* — Hailey R Le
(74) *Attorney, Agent, or Firm* — Suiter Swantz IP

(57) ABSTRACT

A radar system uses multiple nulls to improve detection capabilities. Multiple radar pulses are transmitted and or received, each with a different null pattern. The returns from each pulse are averaged together to form a null window that is less noisy and potentially wider than a single null pattern. This approach can improve the signal-to-noise ratio and make it easier to detect objects of interest. The system may generate individual pulses from an AESA divided into several subarrays. Each subarray produces a pulse with a null in a different location in the radiation pattern centered about a location of interest. The contemporaneous return signals are averaged together.

20 Claims, 3 Drawing Sheets

(56) References Cited

U.S. PATENT DOCUMENTS

2022/0082656 A1\* 3/2022 West .................. G01S 7/2813
2022/0196821 A1\* 6/2022 Amadjikpe ........... G01S 13/881
2022/0397662 A1   12/2022 Schuman \* cited by examiner

AESA-BASED SYNTHETIC NULLING FOR ENHANCED RADAR GROUND CLUTTER SUPPRESSION

BACKGROUND

Radar systems are used for a variety of applications, including detecting and tracking objects in the air or on the ground. However, radar signals can be affected by noise and interference, which can make it difficult to accurately detect objects of interest. One way to address this issue is to use nulls, which are areas of reduced or eliminated signal strength that can be used to suppress noise and interference.

Imperfections in phase and gain within active electronically scanned array (AESA) antennas make it difficult to reliably form a null that both hits its target depth and excludes noise across the full target window. Also, environmental factors such as temperature and element degradation can cause unreliable and inconsistent nulls. Different pointing angles will also contribute to null formation difficulties, especially at deeper pointing angles. Furthermore, two-way sidelobe levels are higher in AESA radars relative to the sidelobe levels achieved by a motor driven waveguide flat plate antenna.

It would be advantageous to have a system and method for producing deep, wide nulls in a radar signal with reduced noise in AESAs.

SUMMARY

In one aspect, embodiments of the inventive concepts disclosed herein are directed to a radar system that uses multiple nulls to improve detection capabilities. Multiple radar pulses are transmitted and/or received with a different null pattern. The returns from each pulse are averaged together to form a null window that is less noisy and potentially wider than a single null pattern. This approach can improve the signal-to-noise ratio and make it easier to detect objects of interest.

In a further aspect, the system may generate individual pulses from an AESA divided into several subarrays. Each subarray produces a pulse with a null in a different location in the radiation pattern centered about a location of interest. The contemporaneous return signals are either summed together in complex numbers, utilizing both amplitude and phase information of the far-field radiation pattern, or alternately averaged together.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
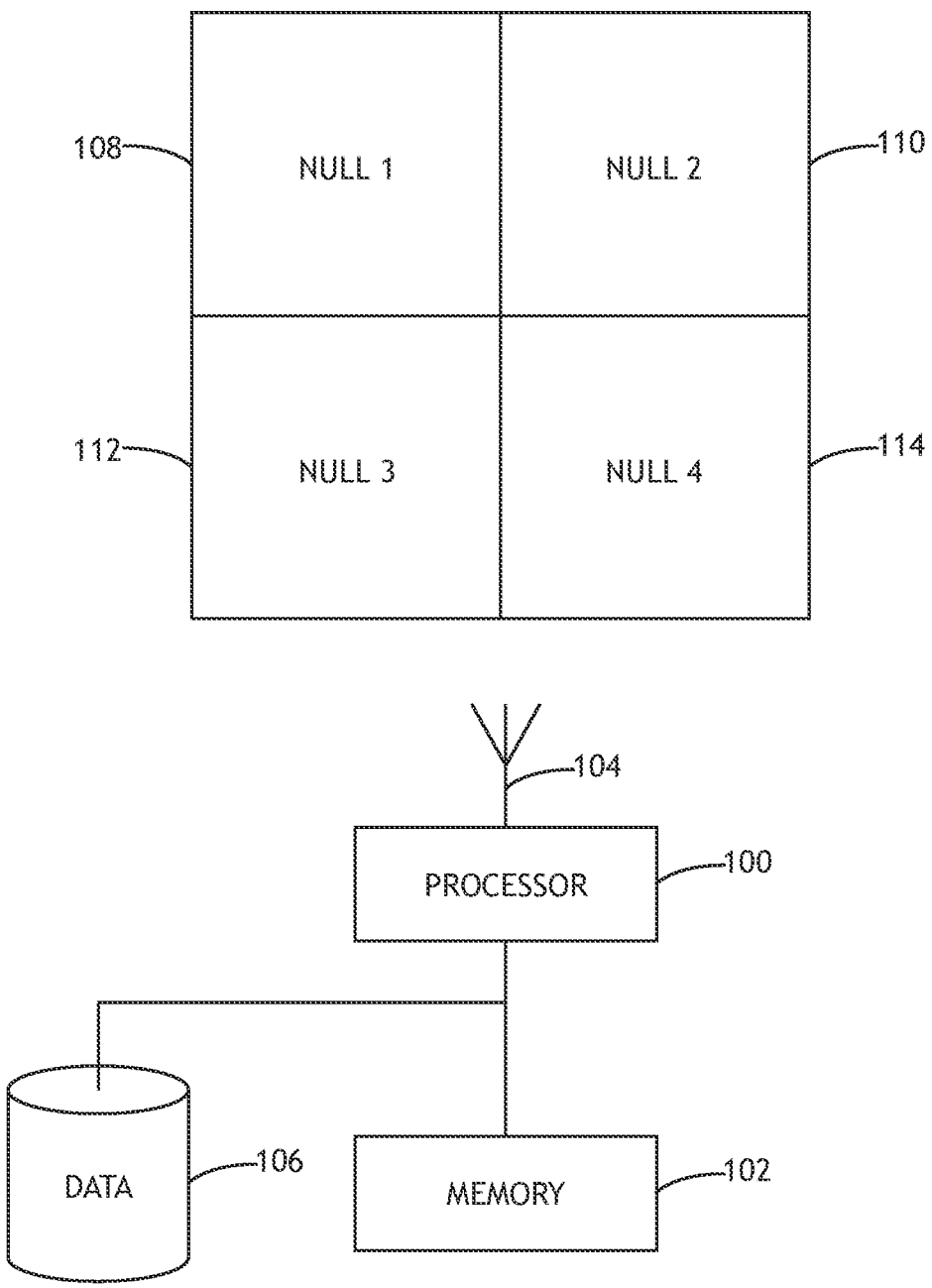
FIG. 1 shows a block diagram of a system for implementing an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a radar system that uses multiple nulls to improve detection capabilities. Radar systems side lobe levels are described as 2-way side lobes, which is a figure of merit that adds the transmit and received far field radiation patterns together as a single pattern. The 2-way radar side lobe patterns can be altered by changing only the transmit pattern, or only the receive pattern, or both. 2-way side lobe patterns are changed synchronously by changing Tx patterns, Rx patterns, or both. For example, Multiple radar pulses are transmitted and/or received with a different null pattern. An aggregate null can be generated through a series of transmit pulses, each with different null locations received in time sync with the radar receiver and coherently added together to realize enhanced null depths or widths in the far field radiation pattern. In this case, the receive pattern remains fixed for each of the different transmit pulses. Another approach is to fix the transmit far field pattern for each pulse and adjust nulls in the receive pattern for each pulse in a time synchronized manner. In this case the pattern summing, or averaging is performed on the receive pulses. Both the per pulse transmit radiation patterns and the per pulse receive radiation patterns can have unique nulls by means of time synced Tx and Rx pulse epochs to effectively enhance both the Tx 1-way and Rx 1-way radiation patterns to time synchronously and simultaneously sum or average both multi-pulse Tx patterns and multi-pulse Rx patterns to realize a superior 2-way null for ground clutter suppression. The returns from each pulse are averaged together to form a null window that is less noisy and potentially wider than a single null pattern. This approach can improve the signal-to-noise ratio and make it easier to detect objects of interest. The system may generate individual pulses from an AESA divided into several subarrays. Each subarray produces a pulse with a null in a different location in the radiation pattern centered about a location of interest. The contemporaneous return signals are averaged together. The use of multiple pulses (Tx-only, Rx-only, or the combination of Tx and Rx pulses), each with different null positions, as described above for the full AESA aperture, can be implement at the individual subarray level as well, and then a multiple pulse aggregate or average full-aperture 2-way radiation pattern can be created by combining the individual subarray patterns.

Referring to FIG. 1, a block diagram of a system for implementing an exemplary embodiment is shown. The system includes a processor 100 and memory 102 for embodying processor executable code to electronically configure an ESA antenna 104 to produce a desired radiation pattern, either for transmit (Tx) or receive (Rx). In at least one embodiment, the processor 100 receives or identifies a location in the radiation pattern where a null is desirable; for example, a location corresponding to ground clutter or other interference. It may be appreciated that the processor 100 may be embodied in a radar system and comprise a transmitter, a receiver, and a digital signal processor (DSP). The transmitter generates radar pulses that are transmitted into the environment, and the receiver collects the return signals from those pulses. In at least one embodiment, the processor 100 may be embodied in a field programmable gate array, system-on-a-chip, or other appropriate solid-state electronics. Such processing may reduce the time required to integrate and synthesize the null window as described herein.

In at least one embodiment, the processor 100 determines multiple electronic configurations for the ESA antenna 104, each including a null in a portion of the radiation pattern at or near the location. Each null may be narrower and deeper than any single null would be covering the entire desired location. The processor 100 then applies those configurations to the ESA antenna 104 in successive pulses, and receives corresponding return signals. The return signals may be stored in a data storage device 106 until all of the return signals are received, then combined together to produce a composite return signal. Alternatively, the return signals may be combined in real-time as the return signals are received. The composite return signal may have a composite null window with less noise than would be possible with a single radiation pattern having a null over the entire desired location. Noise is generally randomized so measurements in the null window over time may reduce noise or facilitate noise filtering.

Because each null may be deeper and/or wider in angular extent than a single null covering the entire desired location, the return signal would have correspondingly less noise within the null window. Combining the return signals may therefore result in a composite signal with less noise over the entire desired location. The null window can be used in any suitable way to suppress noise and interference in radar signals. For example, the null window can be applied to the received signals to suppress noise and interference in real-time, or it can be used to process stored radar data to improve detection capabilities retrospectively.

The processor 100 may combine the return signals via direct complex addition, simple averaging, weighted averaging, or some other function operating on the return signals, including a trained AI algorithm. For example, the processor 100 may apply certain weightings based on the known desired location and width of the null window, and the actual location and width of each null in the corresponding pulse. In at least one embodiment, filtering may be applied to individual return signals before combining into a composite signal.

In at least one embodiment, the processor 100 may electronically separate the ESA antenna 104 into a plurality of subarrays 108, 110, 112, 114. The processor 100 may then electronically configure each subarray 108, 110, 112, 114 to produce a distinct radiation pattern either during Tx, Rx, or both, each having a null in a different location proximal to the desired location. The entire ESA antenna 104 may then be driven to contemporaneously produce a plurality of pulses that are substantially similar except with nulls in slightly different positions in the radiation pattern when applied during transmission. In at least one embodiment, the processor 100 receives the contemporaneous return signals and perform operations to produce a composite return signal. Alternatively, or in addition, the contemporaneous return signals may combine via constructive and destructive interference.

In at least one embodiment, the processor 100 may determine the desired location for a null with reference to a known source of interference or ground clutter; for example, via a set of known interference or ground clutter sources stored in the data storage device 106. Alternatively, or in addition, the processor 100 may determine that a null is desirable based on certain characteristics of prior return signals (characteristics indicative of interference or ground clutter as opposed to actual targets of interest). Furthermore, the processor 100 may apply a null at the desirable location, and subsequently determine that the null is insufficient based a threshold level of noise in a return signal. The processor 100 may then determine a set of deeper, narrower nulls to apply to subsequent signals as described herein.

In at least one embodiment, a null may be generated in a full aperture monopulse TX sum beam and also is the azimuth difference beam and/or the elevation difference beam. The processor 100 may then digitally process the delta elevation and delta azimuth values in a phase monopulse manner.

Figure 2:
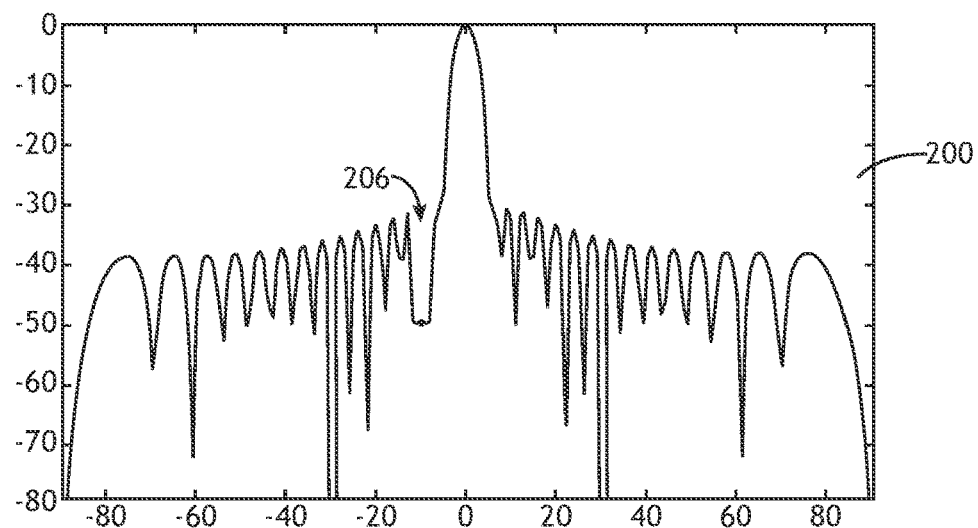
FIG. 2 shows radiation patterns with nulls according to an exemplary embodiment.
Figure 2:
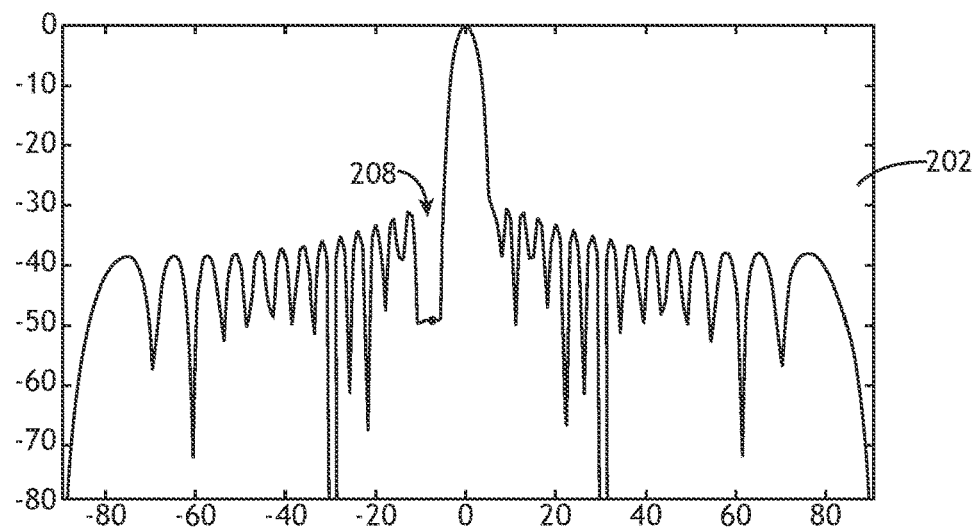
Figure 2:
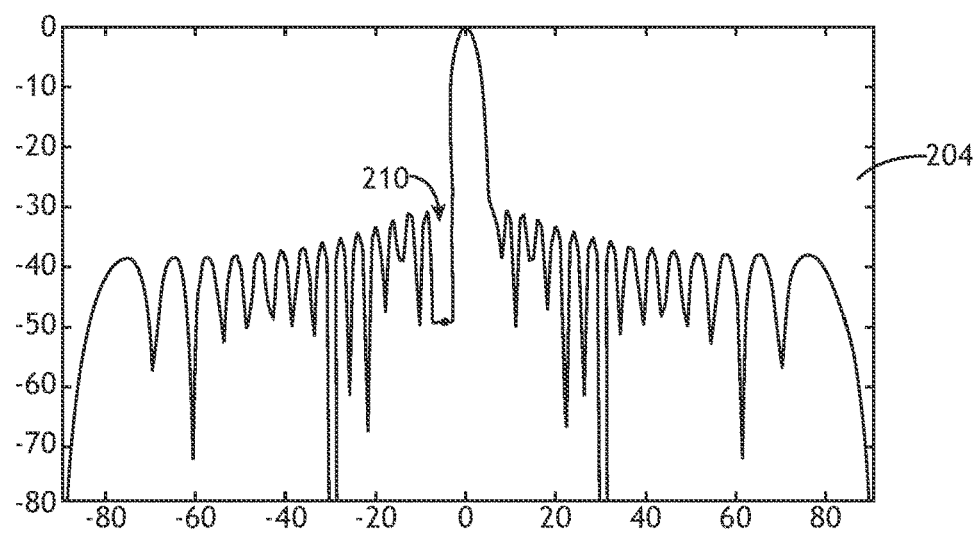

Referring to FIG. 2, radiation patterns 200, 202, 204 with nulls 206, 208, 210 according to an exemplary embodiment are shown. The radiation patterns 200, 202, 204 may be generated by an ESA sequentially, and the return signals stored and combined to form a composite with a null window defined by averaging or other combination of the nulls 206, 208, 210. This process can happen in Rx, Tx or both. Alternatively, or in addition, a single ESA may be electronically divided into subarrays and one of the radiation patterns 200, 202, 204 generated contemporaneously by a corresponding subarray.

In at least one embodiment, the nulls 206, 208, 210 may be defined with respect to a center point and/or some boundary of a desired null window. Each null 206, 208, 210 may typically vary by three to five degrees from the center point.

It may be appreciated that electronic signals to a conventional ESA to generate theoretical nulls of −60 dBi may produce an actual null more on the order of −45 dBi across an entire null window because the Rx patterns are typically low side lobe level (−30 dB) whereas the transmit patterns are not (−13 dB) to maximize power on the radar's target. Embodiments of the present disclosure may produce a composite null window more closely matching the theoretical null. In one example, a target null may be six degrees wide with a depth of −50 dBi, eight degrees off the main lode. A system according to the present disclosure may produce three separate radiation patterns 200, 202, 204, each with a null 206, 208, 210 five degrees wide with a depth of −50 dBi. A first null 206 may be ten degrees off the main lobe, a second null 208 may be eight degrees off the main lobe, and a third null 210 may be six degrees off the main lobe.

Figure 3:
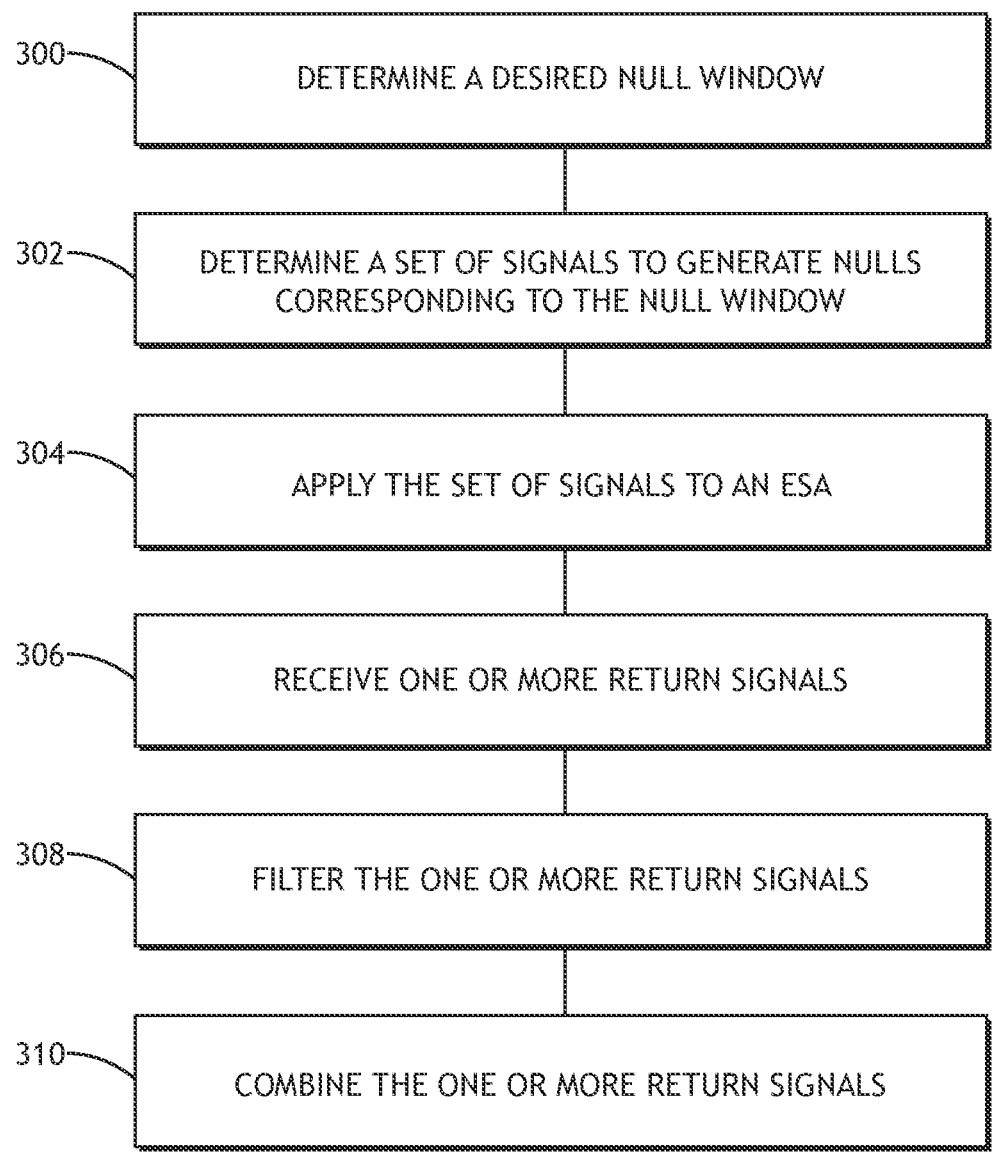
FIG. 3 shows a flowchart of a method for producing a null in a radiation pattern according to an exemplary embodiment.

Referring to FIG. 3, a flowchart of a method for producing a null in a radiation pattern according to an exemplary embodiment is shown. A processor in a radar system may determine 300 or receive a desired null window. The null window may be determined with reference to known interference or ground clutter sources, or via analysis of prior radar return signals. The processor then determines 302 a set of signals to apply to an ESA, (transmit, receive, or both) to produce nulls corresponding to the null window (within boundaries defined by the null window or offset from some central reference point defined by the null window).

The signals are applied 304 to an ESA, either sequentially across the entire aperture, either Tx, Rx, or both, or by dividing the ESA into subarrays and applying a separate signal to each subarray, again, either Tx, Rx, or both. The ESA receives 306 one or more return signals that are then combined 310 to form a composite null window. In at least one embodiment, each return signal may be filtered 308 separately prior to combining 310.

By using multiple null patterns and summing or averaging the returns from each pulse, the system can generate a null window that is less noisy and potentially wider than a single null pattern. This can improve the signal-to-noise ratio and make it easier to detect objects of interest. The synthesis and application of less noisy, wider nulls is paramount for advanced ground clutter suppression techniques and will enhance AESA operations in windshear modes, producing accuracy at least as comparable to mechanical radars.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
    an electronically scanned array (ESA); and
    at least one processor in data communication with a memory storing processor executable code for configuring the at least one processor to:
        determine, for a desired null window corresponding to a source of interference, a plurality of signals each defining a null narrower than the desired null window and offset in location relative to the desired null window;
        apply each of the plurality of signals to the ESA sequentially over multiple pulses and/or contemporaneously across subarrays of the ESA;
        receive one or more return signals corresponding to each of the plurality of signals; and
        coherently combine the return signals to synthesize a composite null window spanning the desired null window.

2. The computer apparatus of claim 1, wherein the at least one processor is further configured to filter each of the one or more return signals before producing the composite null window.

3. The computer apparatus of claim 1, wherein:
    applying each of the plurality of signals to the ESA comprises applying each of the plurality of signals separately and sequentially over a plurality of pulses; and
    producing the composite null window comprises:
        receiving two or more return signals; and
        combining the two or more return signals.

4. The computer apparatus of claim 3, wherein combining the two or more return signals comprises averaging the two or more return signals.

5. The computer apparatus of claim 3, wherein combining the two or more return signals comprises weighted averaging the two or more return signals based on a known location of the desired null window.

6. The computer apparatus of claim 1, wherein:
    applying each of the plurality of signals to the ESA comprises:
        electronically dividing the ESA into two or more subarrays; and
        applying each of the plurality of signals separately to one of the subarrays.

7. The computer apparatus of claim 1, wherein the at least one processor comprises a field programmable gate array.

8. A method comprising:
    determining, for a desired null window corresponding to a source of interference, a plurality of signals to apply to an electronically scanned array (ESA), each defining a null narrower than the desired null window and offset in location relative to the desired null window;
    applying each of the plurality of signals to an ESA sequentially over multiple pulses and/or contemporaneously across subarrays of the ESA;
    receiving one or more return signals corresponding to each of the plurality of signals; and coherently combining the return signals to synthesize a composite null window spanning the desired null window.

9. The method of claim 8, further comprising filtering each of the one or more return signals before producing the composite null window.

10. The method of claim 8, wherein:
applying each of the plurality of signals to the ESA comprises applying each of the plurality of signals separately and sequentially over a plurality of pulses; and
producing the composite null window comprises:
receiving two or more return signals; and
combining the two or more return signals.

11. The method of claim 10, wherein combining the two or more return signals comprises direct complex addition of the two or more return signals.

12. The method of claim 10, wherein combining the two or more return signals comprises weighted averaging the two or more return signals based on a known location of the desired null window.

13. The method of claim 8, wherein:
applying each of the plurality of signals to the ESA comprises:
electronically dividing the ESA into two or more subarrays; and
applying each of the plurality of signals separately to one of the subarrays.

14. A radar system comprising:
an electronically scanned array (ESA); and
at least one processor in data communication with a memory storing processor executable code for configuring the at least one processor to:
determine, for a desired null window corresponding to a source of interference, a plurality of signals each defining a null narrower than the desired null window and offset in location relative to the desired null window;
apply each of the plurality of signals to the ESA sequentially over multiple pulses and/or contemporaneously across subarrays of the ESA;
receive one or more return signals corresponding to each of the plurality of signals; and
coherently combine the return signals to synthesize a composite null window spanning the desired null window.

15. The radar system of claim 14, wherein the at least one processor is further configured to filter each of the one or more return signals before producing the composite null window.

16. The radar system of claim 14, wherein:
applying each of the plurality of signals to the ESA comprises applying each of the plurality of signals separately and sequentially over a plurality of pulses; and
producing the composite null window comprises:
receiving two or more return signals; and
combining the two or more return signals.

17. The radar system of claim 14, wherein the radiation patterns and nulls are applied to both Tx and Rx.

18. The radar system of claim 14, wherein the radiation patterns and nulls are applied to one of Tx or Rx.

19. The radar system of claim 14, wherein:
applying each of the plurality of signals to the ESA comprises:
electronically dividing the ESA into two or more subarrays; and
applying each of the plurality of signals separately to one of the subarrays.

20. The radar system of claim 14, wherein the at least one processor comprises a field programmable gate array.

* * * * *